United States Patent
Hasselbring et al.

(10) Patent No.: US 6,518,955 B1
(45) Date of Patent: Feb. 11, 2003

(54) HAND STABILIZATION APPARATUS FOR AN INPUT DEVICE HAVING A KEYPAD

(75) Inventors: Alan J. Hasselbring, Glendale, AZ (US); Michael C. Little, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/416,478

(22) Filed: Oct. 12, 1999

(51) Int. Cl.[7] .................................................. G09G 5/00
(52) U.S. Cl. ........................ 345/168; 345/173; 345/172
(58) Field of Search ................................ 345/168, 169, 345/172, 173, 156; 341/20, 22, 24

(56) References Cited

U.S. PATENT DOCUMENTS

| | | | | |
|---|---|---|---|---|
| 4,517,424 A | * | 5/1985 | Kroczynski | 400/485 |
| 5,017,030 A | * | 5/1991 | Crews | 400/485 |
| 5,367,298 A | * | 11/1994 | Axthelm | 341/22 |
| 5,707,160 A | * | 1/1998 | Bowen | 400/472 |
| 5,764,164 A | * | 6/1998 | Cartabiano et al. | 341/22 |
| 5,926,119 A | * | 7/1999 | Lindeman et al. | 341/22 |
| 5,945,646 A | * | 8/1999 | Miller et al. | 200/5 R |
| 5,949,401 A | * | 9/1999 | Kazarian | 345/156 |
| 6,127,949 A | * | 10/2000 | Dodd | 341/22 |
| 6,177,926 B1 | * | 1/2001 | Kunert | 345/173 |
| 6,184,804 B1 | * | 2/2001 | Harrison | 341/22 |

* cited by examiner

*Primary Examiner*—Steven Saras
*Assistant Examiner*—Fritz Alphonse

(57) ABSTRACT

On a data input device having a keypad with small, closely spaced buttons, an anchor is located on a panel section mountable proximate, and in fixed relation to, the keypad so that a user can reach the buttons while stabilizing their hand with the anchor.

18 Claims, 3 Drawing Sheets

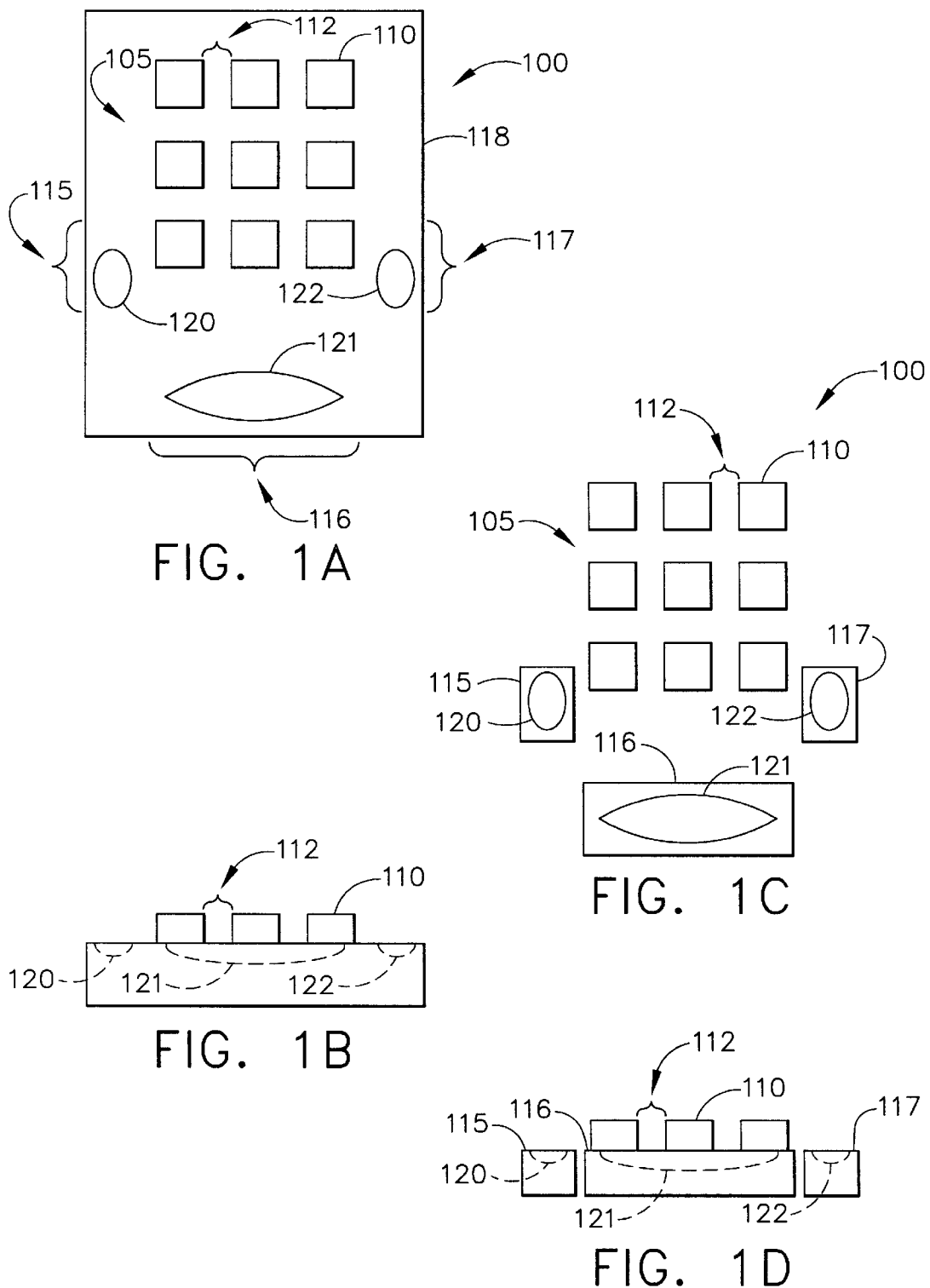

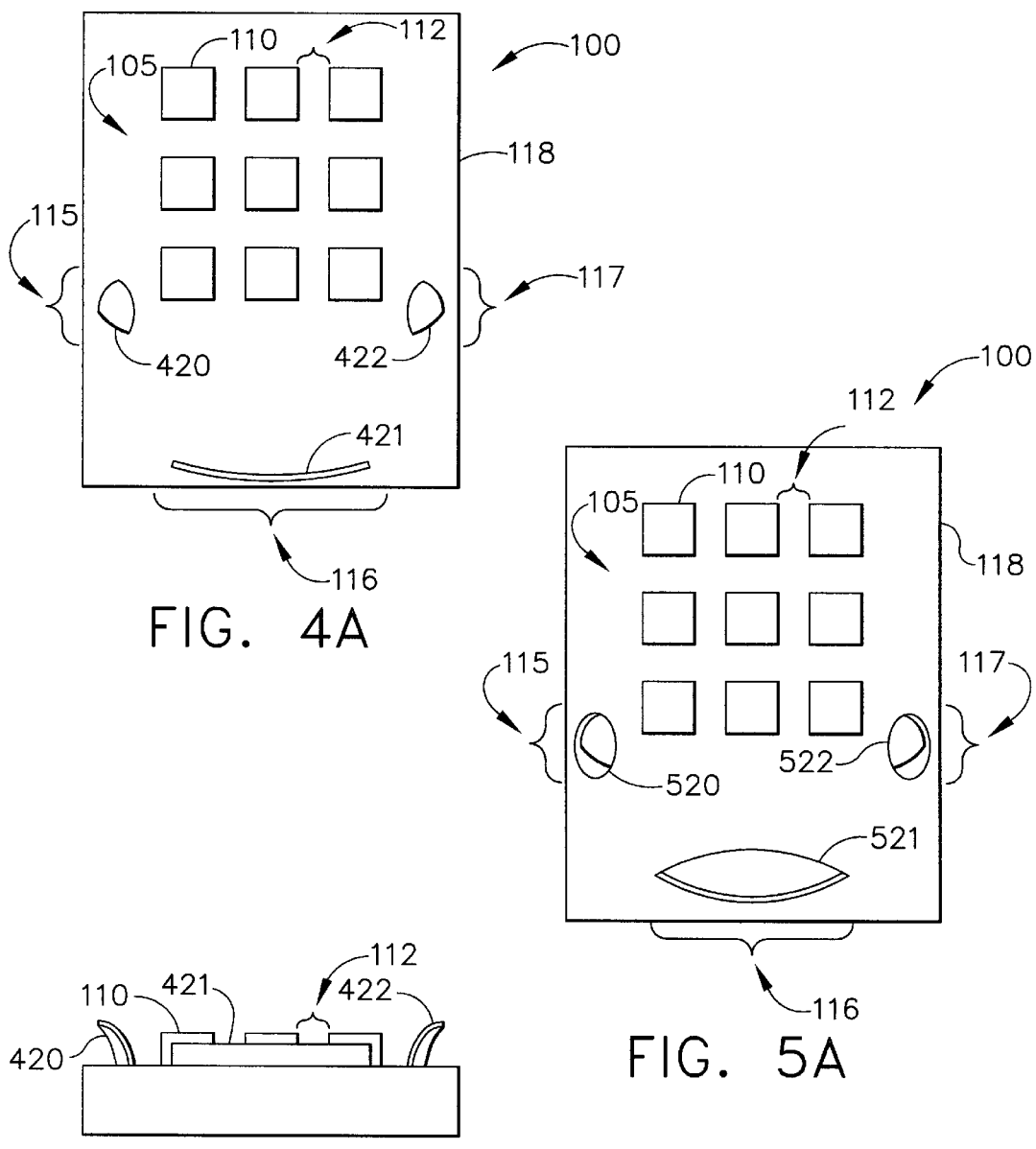

HAND STABILIZATION APPARATUS FOR AN INPUT DEVICE HAVING A KEYPAD

BACKGROUND OF THE INVENTION

1. Technical Field

The present invention generally relates to input devices having keypads and, more particularly, to an apparatus for stabilizing a user's hand interacting with a button on the keypad.

2. Background Information

Data input devices are frequently employed in a variety of environments, including automobiles, marine craft, aircraft, spacecraft, and factories. Examples of data input devices include vehicle controls such as automobile controls and flight management systems, and machine controls for manufacturing systems. These data input devices include a keypad having buttons. A user inputs data through interaction between the user's hand and the buttons.

Because of space limitations, the buttons of the keypad typically are closely spaced and not much larger than the user's fingertip. In addition, these data input devices are often used in a turbulent environment. For example, an aircraft pilot often experiences turbulence while entering data in a flight management system. The small, closely spaced buttons coupled with turbulence and/or unsteady hands of the user causes a common problem of the user inadvertently entering incorrect data. Thus, there is a need to stabilize the user's hand while the user is interacting with the buttons on the keypad.

SUMMARY OF THE INVENTION

The present invention overcomes the foregoing problem and achieves an advance in the art by providing an apparatus for stabilizing a user's hand interacting with a button on a keypad.

In accordance with one aspect of the present invention, an anchor is located on a panel section mountable proximate, and in fixed relation to, the keypad so that a user can reach the buttons while stabilizing their hand with the anchor. The anchor is an indentation approximately the size of the user's fingertip or approximately the size of the heel of the user's hand.

In accordance with another aspect of the present invention, the anchor is a friction pad providing friction between the pad and the finger or heel of the user's hand.

In accordance with a further aspect of the present invention, the anchor is a protrusion providing a surface against which the finger or heel of the user's hand can rest.

BRIEF DESCRIPTION OF THE DRAWINGS

FIG. 1A illustrates a top view and FIG. 1B illustrates a side view of a data input device in accordance with an aspect of the present invention, showing indentations as anchors for stabilizing a user's hand.

FIG. 1C illustrates a top view and FIG. 1D illustrates a side view of the data input device in accordance with an aspect of the present invention, showing indentations as anchors for stabilizing the user's hand.

FIG. 4A illustrates a top view and FIG. 4B illustrates a side view of the data input device in accordance with an aspect of the present invention, showing protrusions as anchors for stabilizing a user's hand.

FIG. 5A illustrates a top view and FIG. 5B illustrates a side view of the data input device in accordance with an aspect of the present invention, showing a combination of indentations and protrusions as anchors for stabilizing a user's hand.

DETAILED DESCRIPTION

Figure 2A:
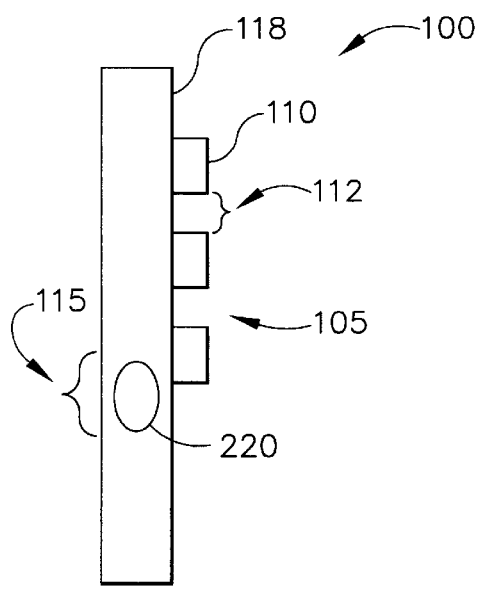
FIG. 2A illustrates a side view and FIG. 2B illustrates an end view of the data input device in accordance with an aspect of the present invention, showing an anchor located on a panel section in a plane perpendicular to the plane of the surface of the buttons.

FIGS. 1A, 1B, 1C, and 1D are discussed in conjunction with one another. FIGS. 1A and 1C illustrate a top view and FIGS. 1B and 1D illustrate a side view of a data input device 100 in accordance with an aspect of the present invention, showing indentations as anchors 120, 121, and 122 for stabilizing a user's hand. The data input device 100 includes a keypad 105 having buttons 110. Typically, the spacing 112 between buttons 110 is less than or equal to the width of a user's fingertip. The buttons 110 are also typically not much larger than the user's fingertip. A user enters data through interaction between the user's hand, specifically the fingers, and the buttons 110. The type of interaction required depends on the type of buttons 110. The anchors of the present invention can be used with any type of buttons 110 that are capable of sensing interaction with the user's fingers. For example, if the buttons 110 are push-buttons, then the user depresses the buttons 110 to enter data. If the buttons 110 are touch-buttons, then the user touches the buttons 110 to enter data. Also, an input device 100 may have a combination of different types of buttons 110.

The data input device 100 also includes panel sections 115, 116, and 117. The panel sections 115, 116, and 117 can be a portion of one continuous panel 118, as shown in FIGS. 1A and 1B, or the panel sections 115, 116, and 117 can be separate from one another, as shown in FIGS. 1C and 1D. In both cases, the panel sections 115, 116, and 117 are mounted fixed in relation to the keypad 105. The panel sections 115, 116, and 117 can be mounted after the keypad 105 is mounted in place. An anchor 120 is located on the surface of the panel section 115, an anchor 121 is located on the surface of the panel section 116, and an anchor 122 is located on the surface of the panel section 117. The anchors 120, 121, and 122 are indentations for stabilizing the user's hand while interacting with the buttons 110. Anchors 120 and 122 have indentations that are essentially circular and approximately the size of a user's fingertip, typically 0.5 inch to 0.75 inch in diameter, although the indentations may be elliptical. Anchor 121 has an indentation that is approximately the size of the heel of a user's hand, typically essentially elliptical in shape, having major and minor axis dimensions of approximately 2.75 inches by 1 inch, respectively. The exact size of these anchors 120, 121, and 122 is not critical, however. The heel of the user's hand is defined as the fleshy rounded base of the user's palm. In one example of stabilizing the user's hand, the user's thumb can be placed in anchor 120, the heel of the user's hand can be placed in anchor 121, and one of the user's fingers can be placed in anchor 122. The panel sections 115, 116, and 117 are mounted proximate the keypad 105 to enable the user to reach the buttons 110 while stabilizing their hand with the anchors 120, 121, and 122. Thus, the average size of a typical user's hand is taken into account when mounting the panel sections 115, 116, and 117 proximate the keypad 105. If the size of the user's hand is known, the spacing between the keypad 105 and the anchors 120, 121, and 122 can be established accordingly.

Any subset of the anchors 120, 121, and 122 can be used to stabilize the user's hand. For example, the user's thumb can be placed in indentation 120 and the heel of user's hand can be placed in indentation 121, without using anchor 122. As another example, the user's thumb can be placed in indentation 120 without using the remaining anchors 121 and 122. As a further example, the heel of the user's hand can be placed in indentation 121 without using the remaining anchors 120 and 122. As another example, the user's thumb can be placed in indentation 120 and a non-thumb finger of the user can be placed in indentation 122, without using anchor 121. Thus, the data input device 100 can have any combination of one or more anchors 120, 121, and 122 for stabilizing the user's hand. However, using more anchors 115, 116, and 117 provides more stability for the user's hand. Also, many types of anchors 120, 121, and 122 can be used, each of the anchors 120, 121, and 122 can be a different type, and the anchors 120, 121, and 122 can be placed in a variety of positions relative to the keypad 105. The remaining figures will illustrate some of the possible configurations.

Figure 2B:
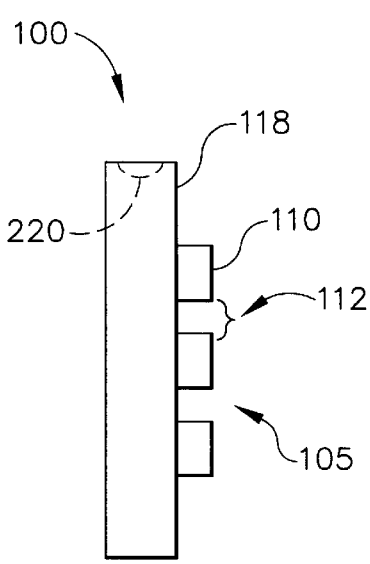

FIGS. 2A and 2B illustrate a side view and an end view, respectively, of the data input device 100 with an anchor 220 located on a panel section 215 in a plane perpendicular to the plane of the surface of the buttons 110, in accordance with an aspect of the present invention. The anchor 220 is shown as an indentation, but again, any type of anchor can be used. The anchor 220 stabilizes the user's hand while interacting with the buttons 110 by, for example, placing the user's thumb or non-thumb finger in the indentation. The anchor 220 has an indentation that is essentially circular and approximately the size of a user's fingertip, typically 0.5 inch to 0.75 inch in diameter, although the indentation may be elliptical. The panel section 215 is mounted proximate the keypad 105 to enable the user to reach the buttons 110 while stabilizing their hand with the anchor 220. Again, the average size of a typical user's hand is taken into account when mounting the panel sections 215 proximate the keypad 105.

Figure 3A:
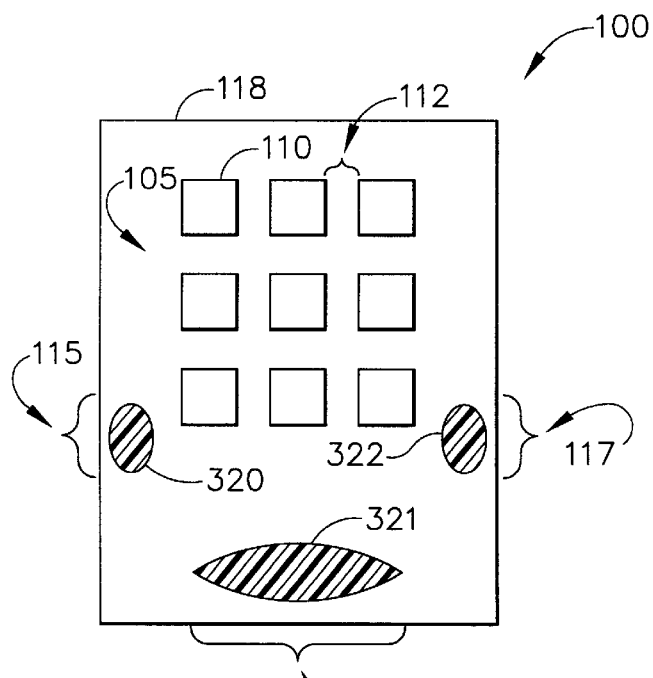
FIG. 3A illustrates a top view and FIG. 3B illustrates a side view of the data input device in accordance with an aspect of the present invention, showing friction pads as anchors for stabilizing a user's hand.
Figure 3B:
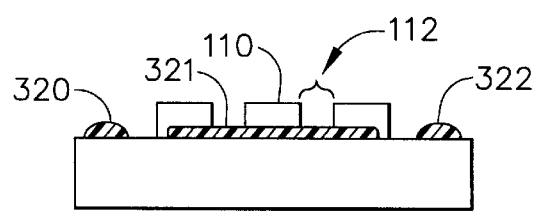

FIGS. 3A and 3B illustrate a top view and a side view, respectively, of the data input device 100 in accordance with an aspect of the present invention, showing friction pads as anchors 320, 321, and 322 for stabilizing a user's hand. The descriptions of FIGS. 1A, 1B, 1C, 1D, 2A, and 2B apply to FIGS. 3A and 3B with the indentations being replaced with friction pads. The anchors 320, 321, and 322 can be any material that creates friction with the user's hand. In other words, when the user's hand is in contact with any one of the anchors 320, 321, and 322, there is a force tangential to the common boundary of the anchor 320, 321, or 322 and the user's hand that resists the motion or tendency to motion of the user's hand relative to the anchor 320, 321, or 322.

FIGS. 4A and 4B illustrate a top view and a side view, respectively, of the data input device 100 in accordance with an aspect of the present invention, showing protrusions as anchors 420, 421, and 422 for stabilizing a user's hand. The descriptions of FIGS. 1A, 1B, 1C, 1D, 2A and 2B apply to FIGS. 4A and 4B with the indentations being replaced with protrusions. The anchors 420, 421, and 422 can be any shape protrusion that provides stability for the user's hand. For example, the anchors 420, 421, and 422 can be straight protrusions that enable the heel of the user's hand and/or the user's fingers to rest against the anchors 420, 421, and 422. As another example, the anchors 420 and 422 can be hooks that enable the user's fingers to slide under the anchors 420 and 422, and the anchor 421 can be curved to more closely match the shape of the heel of the user's hand.

FIGS. 5A and 5B illustrate a top view and a side view, respectively, of the data input device 100 in accordance with an aspect of the present invention, showing a combination of indentations and protrusions as anchors 520, 521, and 522 for stabilizing a user's hand. The descriptions of FIGS. 1A, 1B, 1C, 1D, 2A and 2B apply to FIGS. 5A and 5B with the indentations being replaced with a combination of indentations and protrusions. The protrusions of anchors 520, 521, and 522 are proximate the indentations so that the heel of the user's hand and/or the user's fingers can rest in the indentations while the heel of the user's hand and/or the user's fingers rest against the protrusions. Anchors 520 and 522 have indentations that are essentially circular and approximately the size of a user's fingertip, typically 0.5 inch to 0.75 inch in diameter, although the indentations may be elliptical. Anchor 521 has an indentation that is approximately the size of the heel of a user's hand, typically essentially elliptical in shape, having major and minor axis dimensions of approximately 2.75 inches by 1 inch, respectively. The exact size of these anchors 520, 521, and 522 is not critical, however.

Although certain aspects of the invention have been described herein in conjunction with the appended drawings, those skilled in the art will appreciate that the scope of the invention is not so limited. Modifications in the selection, design, and arrangement of the various components and steps discussed herein may be made without departing from the scope of the invention as set forth in the appended claims.

What is claimed is:

1. A data input device comprising:
    a keypad having a button for inputting information by interaction with a first finger of a user's hand;
    a first panel section proximate, and in fixed relation to, said keypad; and
    a first indentation located on said surface of said first panel section for anchoring a second finger of the user's hand such that said button is within reach of the first finger of the user's hand;
    a second panel section proximate, and in fixed relation to, said keypad; and
    a second indentation located on said surface of said second panel section for anchoring a third finger of the user's hand such that said button is within reach of the first finger on the user's hand.

2. The data input device of claim 1, wherein the first panel section and second section panel are each a portion of one continuous panel.

3. The data input device of claim 1, wherein at least a portion of the plurality of buttons are located between the first indentation and the second indentation.

4. The data input device of claim 1, wherein the first panel section and the second panel section are co-planer with the keypad.

5. The data input device of claim 1, wherein the data input device is coupled to a flight management system.

6. The data input device of claim 1, wherein the first indentation comprises a substantially elliptical indentation and wherein the second indentation comprises a substantially elliptical indentation.

7. The data input device of claim 1, wherein said second finger of the user's hand comprises the thumb and said third finger of the user's hand comprises a non-thumb finger.

8. A data input device for use in an aircraft, in turbulent conditions, comprising:

a keypad having a plurality of closely spaced buttons for inputting information by interaction with a first finger of a user's hand;

a first panel section in fixed relation to said keypad, and proximate one side of said keypad; and a first indentation located on said first panel section for anchoring a second finger of the user's hand in turbulent conditions such that said plurality of buttons are within reach of the first finger of the user's hand;

a second panel section in fixed relation to said keypad, and proximate a side of keypad opposite said one side of said keypad; and a second indentation located on said second panel section for anchoring a third finger of the user's hand in turbulent conditions such that said plurality of buttons are within reach of the first finger of the user's hand.

9. The data input device of claim 8 wherein the first panel section and second section panel are each a portion of one continuous panel.

10. The data input device of claim 8 wherein at least a portion of the plurality of buttons are located between the first indentation and the second indentation.

11. The data input device of claim 8 wherein the first panel section and the second panel section are co-planer with the keypad.

12. The data input device of claim 8 wherein the data input device is coupled to a flight management system.

13. The data input device of claim 8 wherein the first indentation comprises a substantially elliptical indentation and wherein the second indentation comprises a substantially elliptical indentation.

14. The data input device of claim 13 wherein the first and second indentation each have a diameter of between 0.5 and 0.75 inches.

15. A data input device for use in an aircraft, the data input device comprising:

a panel having a top side, a first edge and a second edge;

a keypad on the top side of the panel, the keypad having a plurality of buttons for inputting information by interaction with a first finger of a user's hand;

a first indentation in the top side of the panel, the first indentation located proximate the first edge of the panel;

a second indentation in the top side of the panel, the second indentation located proximate the second edge of the panel; and wherein at least a portion of the plurality of buttons are between the first indentation and the second indentation, such that when the first indentation anchors a second finger of the user's hand and the second indentation anchors a third finger of the user's hand said plurality of buttons are within reach of the first finger of the user's hand.

16. The data input device of claim 15 wherein the keypad is coupled to a flight management system for the aircraft to enter data into the flight management system.

17. The data input device of claim 15 wherein the first indentation comprises a substantially elliptical indentation and wherein the second indentation comprises a substantially elliptical indentation.

18. The data input device of claim 15 wherein the first and second indentation each have a diameter of between 0.5 and 0.75 inches.

\* \* \* \* \*